United States Patent [19]

Cerugeira

[11] Patent Number: 4,966,083
[45] Date of Patent: Oct. 30, 1990

[54] MONOBLOCK PALLET

[76] Inventor: Benedito S. Cerugeira, Rua Itapiru, 281 apto. 55, 04143 São Paulo, Brazil

[21] Appl. No.: 447,015

[22] Filed: Dec. 6, 1989

[30] Foreign Application Priority Data

Dec. 26, 1988 [BR] Brazil .................................. 8806880

[51] Int. Cl.⁵ .......................................... B65D 19/00
[52] U.S. Cl. ................................. 108/51.1; 108/901
[58] Field of Search ............... 108/51.1, 901; 206/386, 206/595, 596

[56] References Cited

U.S. PATENT DOCUMENTS

| | | | |
|---|---|---|---|
| 1,770,614 | 7/1930 | Hennessy | 108/51.1 |
| 3,192,099 | 6/1965 | Beckman et al. | 108/901 |
| 3,199,469 | 8/1965 | Sullivan | 108/901 |
| 3,213,570 | 10/1965 | Abramson | 108/901 |
| 3,604,368 | 9/1971 | Baxter | 108/901 |
| 4,385,564 | 5/1983 | Heggenstaller | 108/51.1 |

Primary Examiner—Kenneth J. Dorner
Assistant Examiner—Geraud A. Anderson
Attorney, Agent, or Firm—Steinberg & Raskin

[57] ABSTRACT

"Monoblock Pallet" comprising only one pressed piece (10) constituted of at least one core in metallic wiring (1) impregnated with a curable material, one lining layer (3) of a curable material impregnated with fragmentary material (2), one layer of reticulated strips (4) of an elastically resistant material impregnated with a curable material (5), and two external layers of a non-slipping material (6), which define the upper area (8) of contact and accommodation of the load, and the lower or inferior area (7) for the insertion of the loading forks of a piler machine.

6 Claims, 1 Drawing Sheet

MONOBLOCK PALLET

This present description refers to a monoblock pallet.

Conventional pallets are generally defined by a depositing that incorporates at it inferior face insertion grooves for the loading blades of a conventional fork piler.

Among these conventional pallets exist those built of wood and there exist some constructed of plastic material.

Pallets constructed with wood are usually made up by a plurality of wood pieces fixed to each other by screws, nails or other suitable fixing means.

Pallets built of plastic material are normally injection molded, so as to constitute a monoblock piece.

In spite of their large use, these conventional pallets, both those of wood and those of injection molded plastic material, present a series of drawbacks which limit their utilization and useful life.

Wooden pallets, for being composed by assembling several wood pieces, have the inconvenient of being subject to the occurrence of clearances among their fixing points and which cause at a certain time period their mis-alignment, turning them fragile and unstable.

This mis-alignment and instability occurring along the time, reduce significantly the pallets useful life' and in addition this may generate destructive contact areas which can damage the load being conveyed.

Another inconvenient of such wooden pallets relates to the material itself, that is, wood which may offer a satisfactory mechanical strength, but it has a low resistance to bad weather and variable moisture which cause, in general, the decaying of the wood and, as a consequence, the loss of the pallet as a whole.

Pallets of injection molded plastic material do overcome some of the existing inconveniences in wooden pallets, since being of injected plastic stock, they present physically a monoblock structure which avoids the occurrence of losenesses, mis-alignment and even the attack of bad weather and moisture, once they are made of impervious material.

However, like all injected materials, such pallets present a wall of reduced thickness, what generates low mechanical strength, aggravated by the incompatibility existing between the materials of the pallet itsef and the blades of the forks of the piler, usually metallic.

Injection molded plastic material has as characteristics a high structural hardness, but subject to breakage, while the metal of the loading blades presents a high structural hardness and high mechanical strength which, due to the frequent contact with the plastic material, creates structural weakening points and leads to the pallets breaking through in an irreparable manner, thereby making completely useless such an injection molded plastic pallet.

It is one object of the present invention to provide a monoblock pallet which eliminates the problems of structural instability and which eliminates creation of destructive contact areas, injurious to the load being transported.

Another object of the invention is to provide a monoblock pallet which is highly resistant against bad weather and moisture and which has high mechanical strength.

Still another object of the present invention is to provide a monoblock pallet which is mechanically. and structurally compatible with both the blades of a fork piler and with any type of load to be conveyed.

Lastly, another object of the invention is to provide a monoblock pallet which presents in its structure as a whole, a certain damping and accomodation elasticity for the load being transported.

These and other objects and advantagens of the present invention are attained by providing a monoblock pallet comprising one sole piece constituted of, at least, a core of metallic wiring impregnated with a curable material, a lining layer of curable material impregnated with fragmentary material, a layer of reticulated strips of a material elastically resistant and impregnated with a curable material, and two end layers of a non-slipping stock,definingthe upper areas of contact and load accomodation, and a lower or inferior area for the insertion of the fork blades of a piling machine of any kind.

This above defined monoblock pallet may have its compounding layers obtained from specific raw materials or obtained by means of recycling scrap materials, as teached in the process of recovering and re utilization of tire steel tread obtained in scrap heaps for tires, object of the patent application of this same applicant, filed on the same date hereof.

In making use of the above mentioned process, the metallic wire core impregnated with a curable material may be formed with a plurality of steel treads aligned in coplanar groups to each other, thereby reducing the cost and the production time of such a pallet.

In the same manner as in the above mentioned process, the layers of reticulated strip ma be obtain by means of a plurality of scrap recovered tire . beads which, when properly grouped, form the reticulated mesh with good elastic resistance after impregnated curable material.

With this constructive conception afforded to monoblock pallets, there is obtained a load accommodating transport platform, with a high rate of impact absorption, high mechanical strength, weather-proof and of a useful duration significantly greater, besides an ample compatibility with any material or load to be transported Next, the invention shall be described with reference being made to the accompanying drawings, in which.

Figure 1:
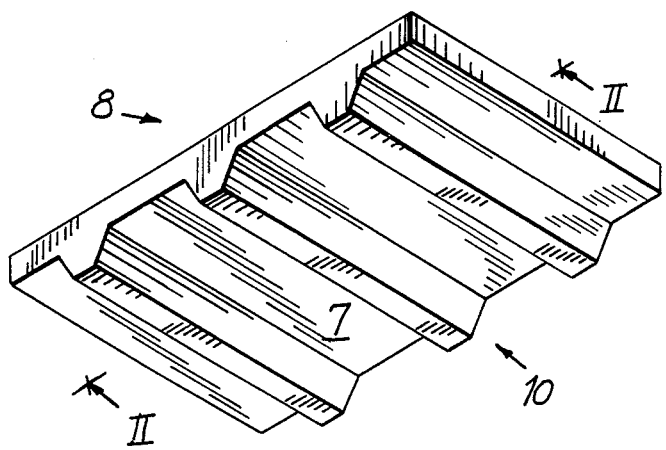
FIG. 1 represents a perspective view of the monoblock pallet of the invention.
Figure 2:
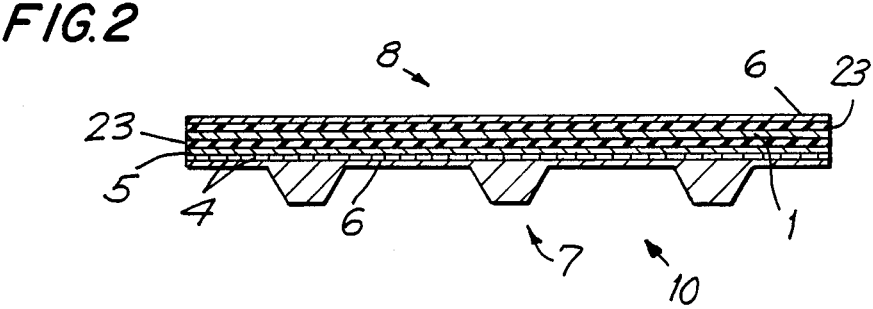
FIG. 2 represents a cross section through the monoblock pallet, along line II—II of FIG. 1.
Figure 3:
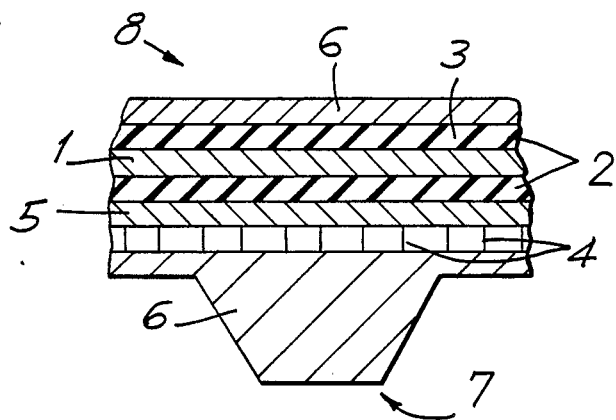
FIG. 3 depicts an enlarged detail of the section showed in FIG. 2.

According to these illustrations, the monoblock pallet of this invention is comprised by one unique hot molded piece or pressed piece 10, incorporating in structure a metallic core 1 defined by a metallic wiring impregnated with rubber, or by a pluralitiy of steel treads recovered from tire scraps, and arranged in groups with respect to each other. This metallic core 1 is disposed between two layers of fragmentary material 2 impregnated with rubber 3, this latter being provided at its lower surface with a layer composed of strips or beads elastically resistant 4, disposed in a way that defines a reticulated mesh impregnated with a curable material 5 said layer assembly 1,2,3,4,5 being sandwiched between two external layers of on-slipping material 6, thereby defining the upper area 8 contacting and accommodating the load, and inferior area 7, for insertion of the forks of a fork lift.

The layer of fragmentary material 2, impregnated with rubber 3, may be formed with small filaments of high mechanical resistance, such as metallic wires and/or synthetic threads, thereby assuring, together it the rubber 3, a high mechanical resistance.

It should be understood that the above described monoblock pallet, although having been illustrated with respect to a preferred embodiment, may be subjected to structural modifications, so as to receive more or less layers, as well as with respect to the order of compactation of the same, without departing from the novel characteristics which particularize the product, i. e., the monoblock pallet.

What is claimed is:

1. Monoblock pallet, characterized in that it is compounded in one sole piece (10), constituted of at least one metallic wiring core (1) impregnated with a curable material, one lining layer (3) of curable material impregnated with fragmentary material (2), one layer of reticulated strips (4) of a material elastically resistant impregnated with a curable material (5), and two external layers of a non-slipping material (6), which define the upper area (8), for contacting and accommodating the load, and the lower or inferior area (7), for the insertion of the loading forks of a fork lift machine.

2. Monoblock pallet according to claim 1, characterized in that said integral piece (10) is hot pressed.

3. Monoblock pallet according to claim 1, characterized in that the fragmentary material (2) is defined by small pieces of filaments of high mechanical resistance, randomly arranged in the curable layer (3).

4. Monoblock pallet according to claim 3, characterized in that the filament pieces (2) are metallic.

5. Monoblock pallet according to claim 1, characterized in that the elastically resistant strips (4) are of rubber, internally provided with metallic filaments.

6. Monoblock pallet according to claim 1, characterized in that the curable material (3,4,6) is an appropriate rubber composition.

* * * * *

UNITED STATES PATENT AND TRADEMARK OFFICE
CERTIFICATE OF CORRECTION

PATENT NO. : 4,966,083
DATED : October 30, 1990
INVENTOR(S) : Benedito Salomao Ceruqeira It is certified that error appears in the above-identified patent and that said Letters Patent is hereby corrected as shown below:

ON THE TITLE PAGE

Under United States Patent [19], change "Cerugeira" to --Salomao Ceruqeira--.

Item [76], the inventor's name "Benedito S. Cerugeira" should be --Benedito Salomao Ceruqeira--.

Signed and Sealed this

Twenty-eighth Day of January, 1992

Attest:

HARRY F. MANBECK, JR.

*Attesting Officer*      *Commissioner of Patents and Trademarks*